United States Patent
Lashinske (12)

(10) Patent No.: US 6,290,304 B1
(45) Date of Patent: Sep. 18, 2001

(54) QUICK CONNECT/RELEASE WHEEL AND HUB ASSEMBLY

(76) Inventor: Charles Mark Lashinske, 455 E. Marigold La., Tempe, AZ (US) 85281

(*) Notice: Subject to any disclaimer, the term of this patent is extended or adjusted under 35 U.S.C. 154(b) by 0 days.

(21) Appl. No.: 09/563,514

(22) Filed: May 3, 2000

(51) Int. Cl.⁷ .................................................. B60B 27/02
(52) U.S. Cl. .................................... 301/110.5; 301/124.2
(58) Field of Search ................................ 301/111, 124.2, 301/110.5, 110.6, 35.61, 35.63, 35.53, 35.55, 35.56, 35.58, 105.1; 411/354, 33

(56) References Cited

U.S. PATENT DOCUMENTS

| | | | |
|---|---|---|---|
| 2,382,589 | * 8/1945 | Trevisan | 301/35.61 X |
| 4,887,685 | * 12/1989 | Shepard et al. | 301/111 X |
| 5,058,913 | 10/1991 | La Riviere et al. | 280/281.1 |
| 5,090,776 | * 2/1992 | Van Breemen | 301/110.5 |
| 5,238,259 | 8/1993 | Wilson et al. | 280/276 |
| 5,332,294 | * 7/1994 | Haeussinger | 301/110.5 |
| 5,549,315 | 8/1996 | Ashman | 280/279 |
| 5,791,672 | * 8/1998 | Masclet | 301/124.2 X |
| 5,984,528 | 11/1999 | Ohtsu | 384/545 |
| 6,030,052 | 2/2000 | Watarai et al. | 301/110.5 |

FOREIGN PATENT DOCUMENTS

| | | | |
|---|---|---|---|
| 2501124-A | * 9/1982 | (FR) | 301/124.2 |
| 2518461-A | * 6/1983 | (FR) | 301/110.5 |
| 2588513-A1 | * 4/1987 | (FR) | 301/111 |
| 175558 | * 2/1922 | (GB) | 301/124.2 |
| 501304 | * 8/1956 | (IT) | 301/110.5 |
| WO-89/04258-A1 | * 5/1989 | (WO) | 301/110.5 |

* cited by examiner

Primary Examiner—D. Glenn Dayoan
Assistant Examiner—Patricia Engle
(74) Attorney, Agent, or Firm—Parsons & Goltry; Robert A. Parsons; Michael W. Goltry (57) ABSTRACT

A quick connect/release wheel and hub assembly includes first and second hub portions. The first hub portion has a dovetail groove formed therein and the second hub portion has a mating dovetail ridge formed therein. The dovetail ridge is positioned to be engaged in the dovetail groove by relative transverse movement of the first and second hub portions from a non-coaxial orientation into a coaxial orientation. The engaged dovetail ridge and dovetail groove hold the first and second hub portions fixedly together in the coaxial orientation. A movable member is coupled to either the first or second hub portion and movable between a position in which the hub portions are held in the coaxial orientation and relative transverse movement is prevented, and a position in which relative transverse movement of the hub portions from the coaxial orientation into the non-coaxial orientation is allowed.

22 Claims, 4 Drawing Sheets

QUICK CONNECT/RELEASE WHEEL AND HUB ASSEMBLY

FIELD OF THE INVENTION

This invention relates to a wheel hub assembly.

More particularly, the present invention relates to a wheel and hub assembly which can be quickly connected to an axle and/or released from the axle.

BACKGROUND OF THE INVENTION

Generally, wheels are fixedly mounted on hubs and the hubs are attached to axles. Bicycles, for example, have a front hub attached to a front wheel with the hub being rotatably mounted on an axle. The front wheel mounting includes a forked frame with each end of the forked portion being bifurcated. The wheel is mounted on the bicycle by inserting the ends of the axle into bifurcations so that the wheel rotates within the forked frame. The ends of the axle are threaded so that nuts threadedly engaged on the axle but against the forked frame and hold the hub rigidly in place. The rear wheel differs from the front wheel in that one or more driving sprockets are fixedly attached to the rear hub and driven by means of a chain and pedals. In this standard bicycle, the front and rear wheels are different, because of the hubs, and are not interchangeable. Further, the wheels are relatively difficult to take off and replace, generally requiring a minimum of one or two wrenches to loosen the nuts.

Similarly, wheels on any other vehicles that require a hub, are generally attached fixedly to the hub and the hub is attached to an axle so as to allow relative rotation of the wheel. All of these wheel and hub assemblies require special tools (wrenches, screwdrivers, pliers, etc.) to remove the wheel from the hub and/or to remove the hub from the axle. Also. the removal and replacement process is generally quite involved, including substantial movement of the wheel to engage it with the hub or to engage the hub with the axle, and the time consuming threading of nuts onto retaining bolts or screws into threaded openings. Further, in many instances (notably with bicycles) wheels are not interchangeable and several different spares must be maintained in the event of damage to either wheel.

It would be highly advantageous, therefore, to remedy the foregoing and other deficiencies inherent in the prior art.

Accordingly, it is an object of the present invention to provide a new and improved quick connect wheel hub assembly.

Another object of the invention is to provide a new and improved quick connect wheel hub assembly which is inexpensive and easy to use.

And another object of the invention is to provide a new and improved quick connect wheel hub assembly which allows the changing of a wheel quickly and without the need for tools.

Still another object of the present invention is to provide a new and improved quick connect wheel hub assembly which allows a common wheel to be used.

Yet another object of the invention is to provide a new and improved quick connect wheel hub assembly which allows a wheel to be quickly changed with little movement while providing a highly rugged and safe mounting.

SUMMARY OF THE INVENTION

Briefly, to achieve the desired objects of the instant invention in accordance with a preferred embodiment thereof, provided is a quick connect/release wheel and hub assembly including first and second hub portions. The first hub portion is constructed for rotation about an axis and has a dovetail groove formed therein generally transverse to the axis. A second hub portion is constructed for rotation about the axis and has a mating dovetail ridge formed therein generally transverse to the axis. The dovetail ridge is positioned to be engaged in the dovetail groove by relative transverse movement of the first and second hub portions from a non-coaxial orientation into a coaxial orientation. The engaged dovetail ridge and dovetail groove hold the first and second hub portions fixedly together in the coaxial orientation. A wheel is attached to one of the first and second hub portions for rotation with the one of the first and second hub portions about the axis. A movable member is coupled to one of the first and second hub portions and movable between a connect position in which the first and second hub portions are held in the coaxial orientation and relative transverse movement of the first and second hub portions is prevented, and a release position in which relative transverse movement of the first and second hub portions from the coaxial orientation into the non-coaxial orientation is allowed.

In the preferred embodiment, the dovetail ridge and groove abut along the entire length to provide a very rugged wheel mount. Also, a relatively short transverse movement disengages or releases the dovetail ridge and groove to remove the wheel. The same mounting structure can be used on different wheels, such as the back and front wheels of a bicycle, so that wheels and wheel mountings are standardized to reduce parts and simplify manufacturing and maintenance.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
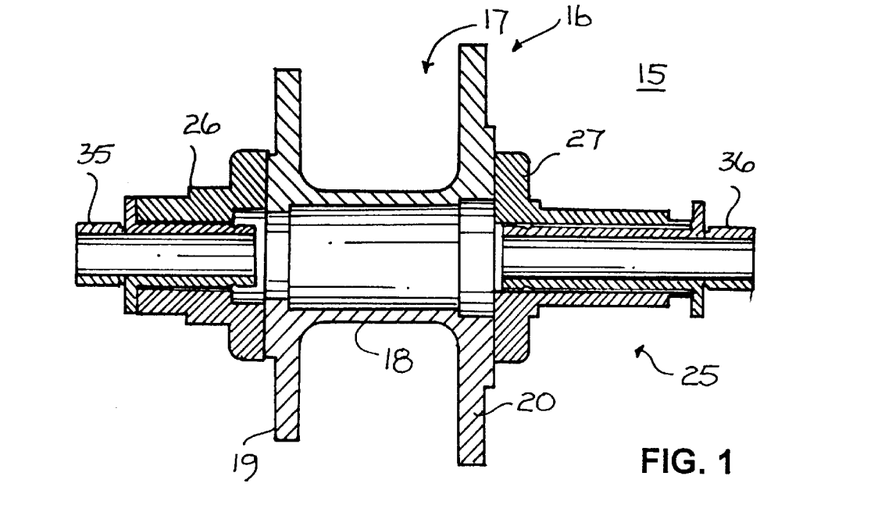
FIG. 1 is a sectional view through a wheel and hub assembly, in accordance with the present invention.

Turning now to the drawings and specifically to FIG. 1, a sectional view of a wheel and hub assembly 15, in accordance with the present invention, is illustrated. Assembly 15 can be, for example, a front wheel of a bicycle (not shown). In the specific embodiment illustrated, assembly 15 includes a wheel 16 having a wheel hub 17. Wheel hub 17 includes a central cylindrical portion 18 defining an axis of rotation, a left disk shaped portion 19 formed integrally with portion 18, and a right disk shaped portion 20 also formed integrally with portion 18. Here it should be understood that throughout this description the terms "left" and "right" are used with reference to the drawings only for simplicity of this description and are not intended to in any way limit the structure or the invention. Wheel 16 is completed by attaching a rim (not shown) to disk shaped portions 19 and 20 by spokes or the like (not shown) in a well known manner. Assembly 15 also includes a mounting hub 25 mounted for rotation with wheel 16. Mounting hub 25 includes a left portion 26 and a right portion 27 each having an inwardly directed face that mates with the outwardly directed faces of disk shaped portions 18 and 19 of wheel hub 17, as will be explained in more detail below.

Figure 2:
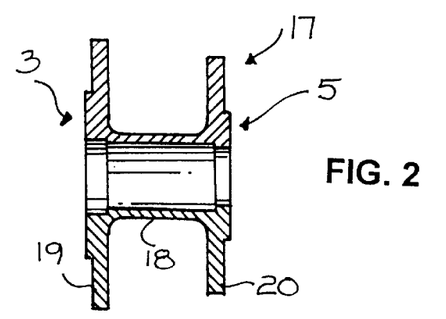
FIG. 2 is a sectional view of the wheel of FIG. 1.
Figure 3:
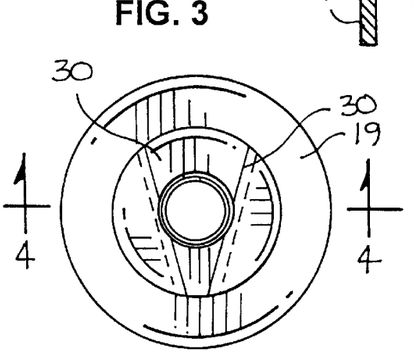
FIG. 3 is an end elevational view as seen from the line 3—3 of FIG. 2.
Figure 4:
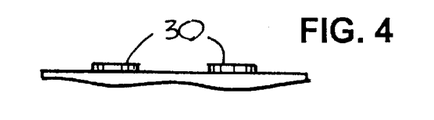
FIG. 4 is a sectional view as seen from the line 4—4 of FIG. 3.
Figure 5:
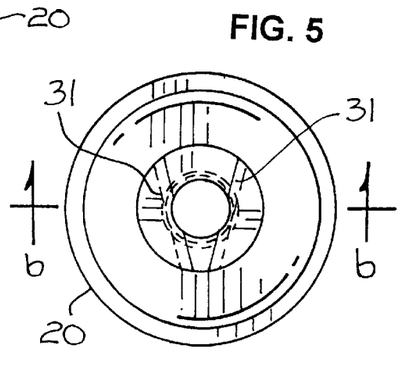
FIG. 5 is an end elevational view as seen from the line 5—5 of FIG. 2.
Figure 6:
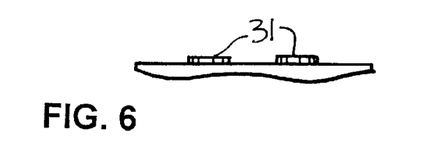
FIG. 6 is a sectional view as seen from the line 6—6 of FIG. 5.

Referring additionally to FIGS. 2 through 6, specific details of the mating features of wheel hub 17 are illustrated. Turning to FIG. 2, wheel hub 17 is illustrated in a sectional view. The left face of disk shaped portion 19 is illustrated in FIG. 3 and the right face of disk shaped portion 20 is illustrated in FIG. 5. As can be seen with reference to FIGS. 3 and 4, the left face of disk shaped portion 19 includes a spaced apart pair of opposing dovetail elements 30 cooperating to form a dovetail groove positioned thereon. Similarly, the right face of disk shaped portion 20 includes a spaced apart pair of opposing dovetail elements 31 cooperating to form a dovetail groove positioned thereon. While dovetail grooves are illustrated for purposes of this description and mating dovetail ridges will be described later, it should be understood that dovetail ridges could be used on the faces of portions 19 and 20 if desired. Further, in this preferred embodiment, pairs of opposing dovetail elements 30 and 31 are positioned to taper toward each other in a truncated V-shaped configuration. As will be explained in more detail presently, this novel configuration allows for quick connect and disconnect of wheel hub 17 and mounting hub 25 with a minimum of transverse or lateral movement.

The inwardly directed face of left portion 26 of mounting hub 25 has a pair of spaced apart dovetail elements (not visible) cooperating to form a dovetail ridge which is designed and positioned to mate with the dovetail groove formed on the outwardly directed face of disk shaped portion 19 of wheel hub 17. Similarly, the inwardly directed face of right portion 27 of mounting hub 25 has a pair of spaced apart dovetail elements (not visible) cooperating to form a dovetail ridge which is designed and positioned to mate with the dovetail groove formed on the outwardly directed face of disk shaped portion 20 of wheel hub 17. Wheel hub 17 is assembled in mounting hub 25 by placing disk shaped portions 19 and 20 of wheel hub 17 parallel and between but axially misaligned with the inner faces of left and right portions 26 and 27. The dovetail ridges on left and right portions 26 and 27 are placed between the dovetail grooves on disk shaped portions 19 and 20. Either wheel hub 17 or mounting hub 25 (whichever is most convenient) is moved transversely until the entire edges of the dovetail ridges and the dovetail grooves are in abutting engagement (referred to herein as complete engagement or completely engaged). Wheel hub 17 and mounting hub 25 are accurately designed so that they are coaxially aligned when complete engagement of the dovetail ridge within dovetail groove occurs. As will be understood by those skilled in the art, by forming the dovetail ridges and grooves in a truncated generally V-shape formation, further relative transverse movement is prevented by the complete engagement. Also, the amount of relative transverse movement required for complete engagement can be as little as the depth of the dovetail grooves.

Returning attention to FIG. 1, an axially aligned central cylinder 35 is illustrated coaxially mounted within left portion 26 of mounting hub 25. Similarly, an axially aligned central cylinder 36 is illustrated coaxially mounted within right portion 27 of mounting hub 25. Central cylinders 35 and 36 represent portions of an axle designed to be mounted in, for example, the front forked frame of a bicycle with each end of the forked portion being bifurcated to engage an outer end thereof. In this case a pin (not shown) is extended through cylinders 35 and 36 and wheel hub 17, once complete engagement of the dovetail groove and dovetail ridge is accomplished. The pin prevents relative transverse movement of wheel hub 17 and mounting hub 25 (i.e. disengagement of the dovetail ridge from the dovetail groove) so that they are locked firmly together in coaxial alignment. Because the dovetail ridge and the dovetail groove are engaged (abutting) along their entire lengths, wheel hub 17 is attached to mounting hub 25 with a maximum of strength.

One of the novel features of the present invention is that wheels mounted in accordance with the present invention can be easily mounted and removed and are interchangeable with other wheels. As an example of this feature and for purposes of explanation only, FIGS. 7 through 9 illustrate apparatus for mounting the wheel of FIGS. 3 through 6 on the rear of a bicycle (whereas, FIG. 1 illustrates the same wheel mounted on the front of a bicycle).

Figure 7:
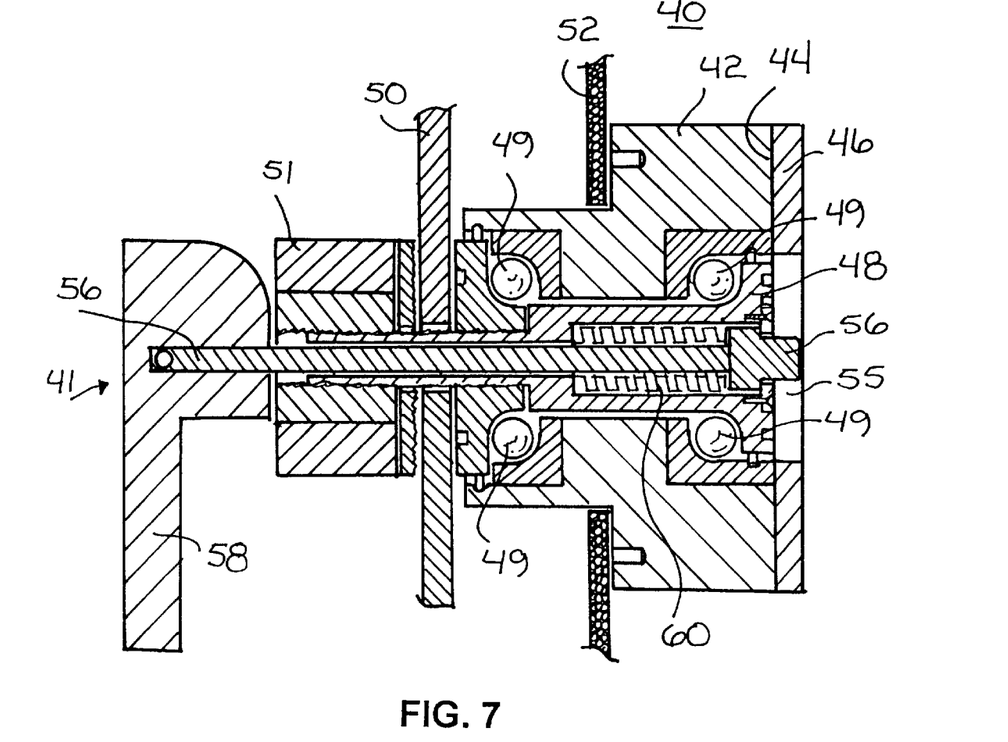
FIG. 7 is a sectional view of one side of a rear hub and locking assembly for a bicycle, portions thereof broken away.

Referring specifically to FIG. 7, one side of a rear mounting hub 40 and locking assembly 41 for a bicycle is illustrated. A portion 42 of mounting hub 40 includes an inwardly directed face 44 which is constructed to be positioned adjacent the outwardly directed face of disk shaped portion 19 of wheel hub 17 (FIG. 2). One of a dovetail groove and a dovetail ridge is formed on face 44 to mate with the other of the dovetail ridge or dovetail groove formed on the outwardly directed face of disk shaped portion 19. In this specific embodiment a dovetail ridge 46 is formed by providing two opposing spaced apart dovetail elements in a truncated generally V-shape formation that mate with dovetail elements 30 on disk shaped portion 19. Portion 42 of mounting hub 40 is mounted on a partial axle 48 by ball bearings 49 for rotation with wheel hub 17. A frame 50, in this specific embodiment one fork of a rear forked frame of a bicycle, is engaged over the end of partial axle 48 and held firmly in place by a locking nut 51 threadedly engaged on partial axle 48. A disk 52 for a brake is attached to portion 42 of mounting hub 40 for rotation therewith.

Locking assembly 41 is provided with mounting hub 40 to either lock wheel hub 17 fixedly in a mounted position or to allow quick and easy release thereof. To this end, partial axle 48 of mounting hub 40 and wheel hub 17 cooperate to define an aperture 55 designed to have mounted therein a moveable member coupled to the mounting hub and movable between a connect position and a release position. In this specific embodiment, the moveable member of locking assembly 41 is an elongated pin 56 mounted coaxially within aperture 55 for longitudinal movement along the axis of mounting hub 40 and wheel hub 17. The left end of pin 56 has a camacting lever 58 pivotally attached thereto and a compression spring 60 is positioned in aperture 55 to bear against a shoulder on pin 56 and bias it into the connect position illustrated in FIG. 7. To move pin 56 into the release position, the left end of cam-acting lever 58 is rotated upwardly, which cams pin 56 to the left in FIG. 7 withdrawing pin 56 into aperture 55. In the release position, compression spring 60 is compressed and produces a bias on pin 56 which causes pin 56 to move positively into the locked position once lever 58 is released (rotated downwardly).

Figure 8:
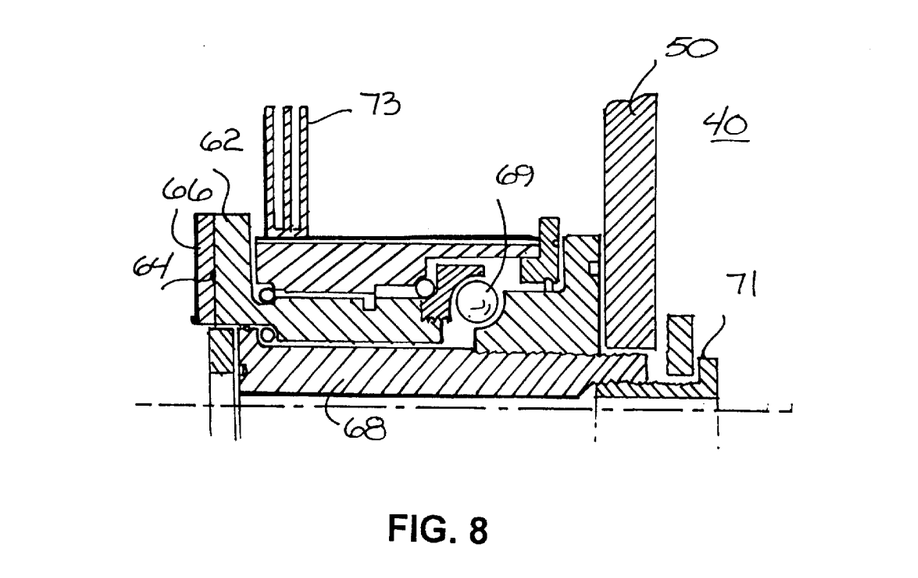
FIG. 8 is a sectional view of the other side of the rear hub and drive assembly for a bicycle, portions thereof broken away.
Figure 9:
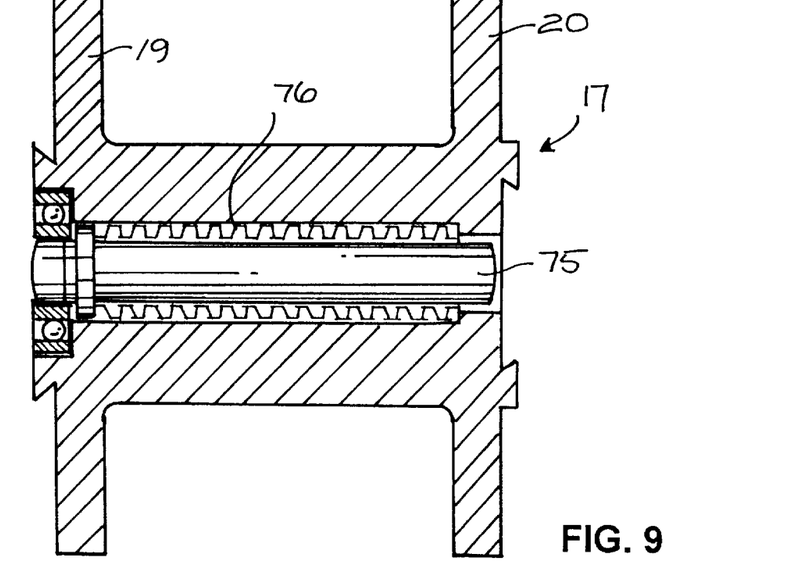
FIG. 9 is a sectional view, portions thereof broken away of a locking mechanism for a wheel hub, similar to the wheel hub of FIG. 2.

Referring specifically to FIG. 8, the other side of rear mounting hub 40 for a bicycle is illustrated. In this figure, only the upper half of the assembly is illustrated, since the lower half is a mirror image. A portion 62 of mounting hub 40 includes an inwardly directed face 64 which is constructed to be positioned adjacent the outwardly directed face of disk shaped portion 20 of wheel hub 17 (FIG. 2). One of a dovetail groove and a dovetail ridge is formed on face 64 to mate with the other of the dovetail ridge or dovetail groove formed on the outwardly directed face of disk shaped portion 20. In this specific embodiment a dovetail ridge 66 is formed by providing two opposing spaced apart dovetail elements in a truncated generally V-shape formation that mate with dovetail elements 31 on disk shaped portion 20. Portion 62 of mounting hub 40 is mounted on a partial axle 68 by ball bearings 69 for rotation with wheel hub 17. Frame 50, in this specific embodiment the other fork of a rear forked frame of a bicycle, is engaged over the end of partial axle 68 and held firmly in place by a locking mechanism 71 threadedly engaged on partial axle 68. One or more sprockets 73 are attached to portion 62 of mounting hub 40 for driving rotation thereof.

Referring additionally to FIG. 9, wheel hub 17 is illustrated in a sectional view with the lower half broken away. In this specific embodiment an elongated locking pin 75 is coaxially mounted within wheel hub 17 for longitudinal movement. A compression spring 76 is positioned around pin 75 and extends between an inwardly directed shoulder on wheel hub 17 and an outwardly directed shoulder on pin 75. Spring 76 biases pin 75 into a release position (shown in FIG. 9) so that when wheel hub 17 is not mounted in a mounting hub, pin 75 is drawn into the central aperture of wheel hub 17. This release position retains pin 75 out of the way for quick and easy mounting operations.

Figure 10:
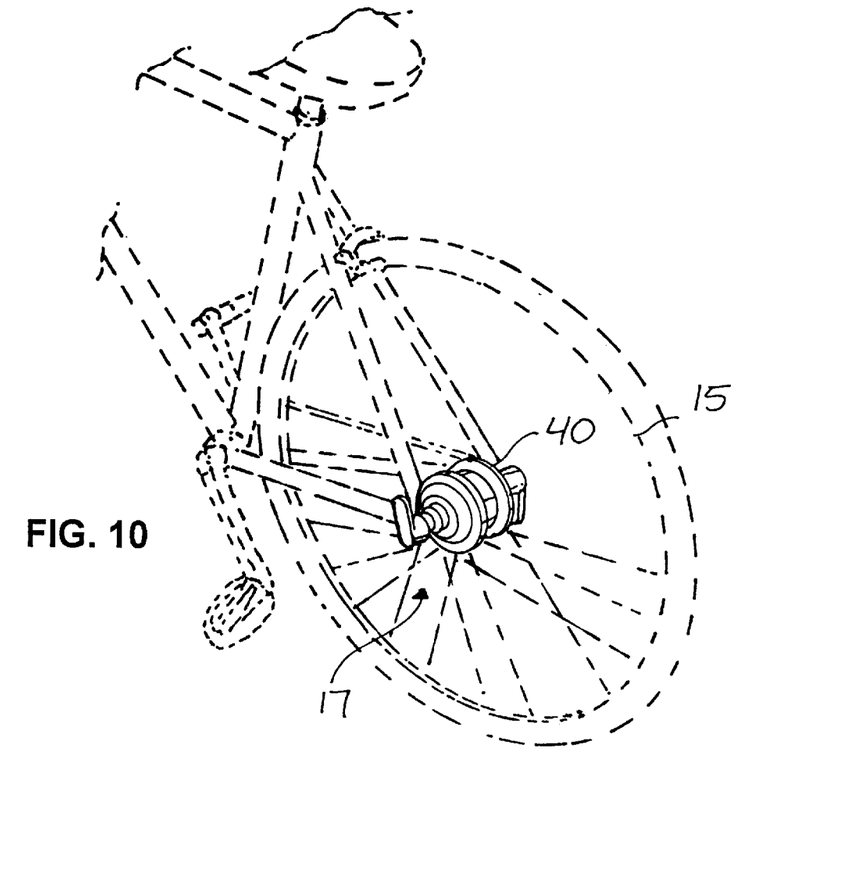
FIG. 10 is a perspective view of a bicycle with the rear hub and locking assembly mounted thereon in accordance with the present invention.

To mount wheel hub 17 in mounting hub 40, wheel hub 17 is positioned between portions 42 and 62 with faces 44 and 64 parallel to the outer facing disk shaped portions 19 and 20 but displaced transversely from coaxial alignment. Dovetail elements 30 and 31 (cooperating to form dovetail groove) are positioned parallel to dovetail elements 46 and 66 (cooperating to form the mating dovetail ridge). Wheel hub 17 and/or mounting hub 40 are moved relatively into coaxial alignment until the entire edges of the dovetail ridges and the dovetail grooves are in abutting engagement, which firmly engages dovetail elements 30 and 31 with dovetail elements 46 and 66 and firmly and ruggedly mounts wheel 15 on the bicycle (see FIG. 10). Locking lever 58, which was rotated upwardly during the mounting process, is rotated downwardly into the locked position, which allows pin 56 to be biased into the locking or connect position illustrated in FIG. 7. When pin 56 moves axially inwardly within aperture 55 it buts against pin 75 (FIG. 9) and forces pin 75 to the left into the central aperture in mounting hub portion 62 (FIG. 8). Thus the combination of pin 56 and pin 75 prevent relative transverse movement of wheel hub 17 and mounting hub 40 so that the dovetail ridges and the dovetail grooves are fixedly held in abutting engagement and wheel 15 is firmly and ruggedly mounted on the bicycle.

To remove wheel 15 from the bicycle, locking lever 58 is simply rotated upwardly into the release position. Pin 56 is withdrawn into aperture 55 compressing spring 60. As pin 56 is withdrawn, pin 75 in wheel hub 17 is biased into the release position, shown in FIG. 9, and wheel hub 17 can be easily moved transversely relative to mounting hub 40 to disengage the dovetail ridges and the dovetail grooves. Wheel hub 17 can be constructed with dovetail ridges and grooves on both or either side, with multiple ridges and grooves and with any desired combination of ridges and grooves, as desired. The only requirement is that all ridges and grooves on both or either side must mate simultaneously with the relative transverse movement. Here it should be specifically noted that wheel 15 and wheel hub 17 can be mounted as either the front or back wheel of the bicycle with equal ease. Thus, a single spare wheel can be used as a replacement for either the front or back wheels of the bicycle. Further, it should be noted that the amount of transverse movement required for locking or releasing wheel 15 is approximately equal to the width of the dovetail ridges or the dovetail grooves. Thus, a minimum of transverse movement is required and wheels can be very quickly and easily mounted or removed.

Figure 11:
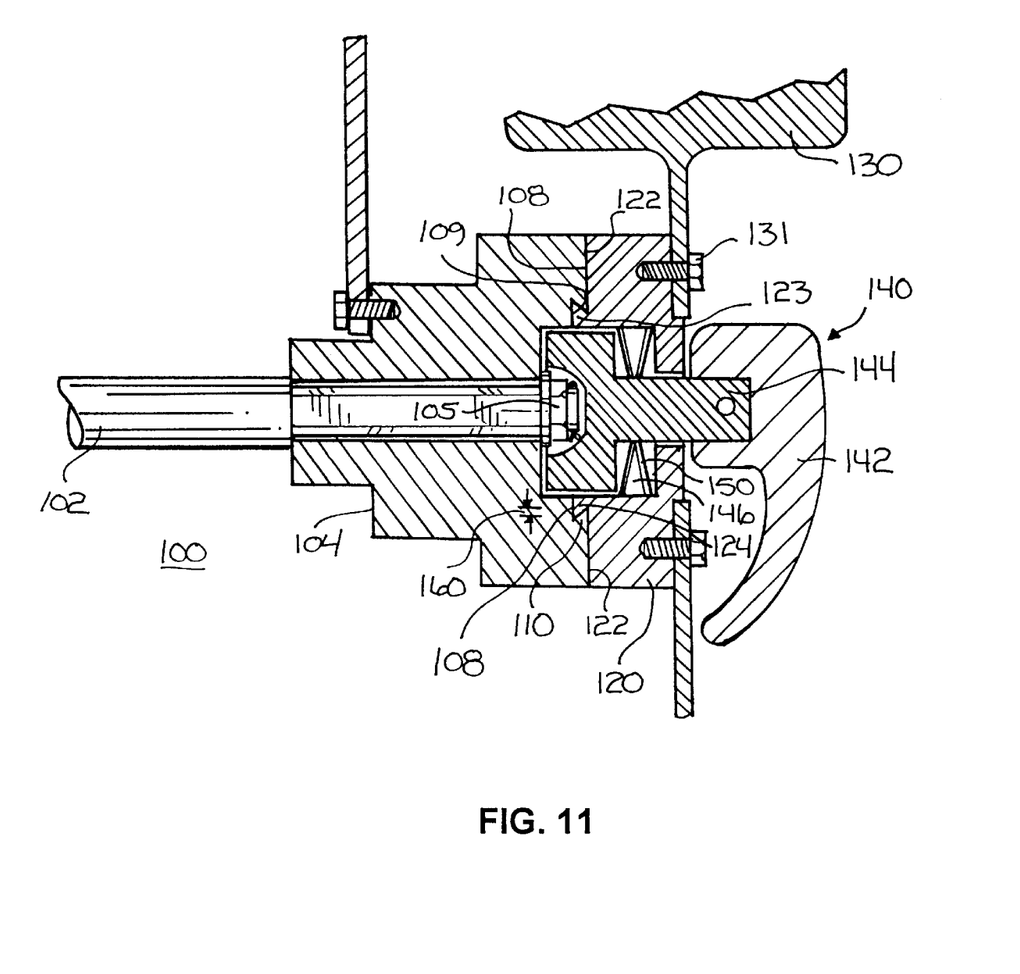
FIG. 11 is a sectional view of another embodiment of a quick release wheel and hub assembly in accordance with the present invention.

Turning now to FIG. 11, a quick connect/release wheel and hub assembly 100 is illustrated as another embodiment of the present invention. Assembly 100 includes an axle 102 mounted on a vehicle (not shown) for rotation (either driven or following). A mounting hub 104 is splined onto axle 102 for rotation therewith and is held fixedly in place by a nut 105. A disk brake is optionally attached to mounting hub 104 as, for example, by attaching a disk 106 to mounting hub 104 for rotation therewith. Mounting hub 104 has an outwardly directed face 108 on which is formed one of a dovetail groove and a dovetail ridge. In this specific embodiment, spaced apart, opposing elongated dovetail elements 109 and 110 cooperate to define a dovetail groove therebetween. In a preferred embodiment, elements 109 and 110 taper toward each other in a truncated V-shaped configuration.

A wheel hub 120 has an inwardly directed face 122 on which is formed a mating one of a dovetail groove and a dovetail ridge. In this specific embodiment, spaced apart, opposing elongated dovetail elements 123 and 124 cooperate to define a dovetail ridge therebetween. In a preferred embodiment, elements 123 and 124 taper toward each other in a truncated V-shaped configuration specifically designed to mate with the truncated V-shaped configuration of elements 109 and 110. A wheel 130 is affixed to wheel hub 120 by means of bolts 131 for rotation therewith. While a specific dovetail groove and mating ridge are illustrated for purposes of this explanation, it will be understood by those skilled in the art that mounting hub 104 and wheel hub 120 can be constructed with any combination of dovetail ridges and grooves, e.g., with multiple ridges and grooves, as desired. The only requirement is that all ridges and grooves on both or either hub portion must mate simultaneously with relative transverse movement.

A locking mechanism 140 includes a locking lever 142 pivotally attached to one end of an axially movable member 144. Mounting hub 104 and wheel hub 120 define an axially extending aperture 146 in which movable member 144 is positioned. Compression spring or springs 150 are positioned in aperture 146 so as to bear against a shoulder on movable member 144 and a shoulder on wheel hub 120. In the connect or locked position (illustrated in FIG. 11) movable member 144 is biased inwardly by spring 150 into the portion of aperture 146 in mounting hub 104. A portion of movable member 144 also remains in the portion of aperture 146 defined by wheel hub 120. Thus, in the connect or locked position movable member 144 prevents relative transverse movement of wheel hub 120 and mounting hub 104. When locking lever 142 is rotated upwardly, movable member 146 is cammed outwardly so that it reside completely within the portion of aperture 146 defined by wheel hub 120. This release position allows relative transverse movement of wheel hub 120 and mounting hub 104.

Thus, to mount wheel 130 on axle 102, locking lever 142 is rotated upwardly to the release position in which movable member 146 is cammed into wheel hub 120. Wheel 130 is positioned so that face 122 of wheel hub 120 is parallel and adjacent face 108 of mounting hub 104. Wheel hub 120 is then moved transversely relative to mounting hub 104 so that the dovetail ridge defined by dovetail elements 123 and 124 engage the dovetail groove defined by dovetail elements 109 and 110. When the dovetail ridge and the dovetail groove are completely engaged, wheel 130 is fixedly attached to axle 102. Locking lever 142 is then rotated downwardly and movable member 144 is biased into the locked position by spring 150. In the locked position, movable member 144 prevents any relative movement of mounting hub 104 and wheel hub 120 so that they remain fixedly and ruggedly attached together. Because the dovetail ridges and dovetail grooves are fixedly engaged along their entire lengths and because they can be constructed very ruggedly, this novel mounting of wheel 130 on axle 102 can be more rugged and reliable than present wheel mounting apparatus (e.g. bolts and the like).

While any embodiment of dovetail grooves and dovetail ridges can be used, by using the preferred dovetail grooves and ridges which include a pair of spaced apart opposing elongated dovetail elements positioned to taper toward each other in a truncated V-shaped configuration, the assembly can be made very rugged and the amount of transverse movement for engaging or disengaging a wheel is substantially reduced. This minimum transverse movement can be seen by referring to FIG. 11. To disengage the dovetail ridge from the dovetail groove with a minimum amount of movement, wheel hub 120 can be moved transversely a distance slightly greater than the overlap (designated 160 in FIG. 11) between the dovetail groove and the dovetail ridge (generally a fraction of an inch). In spite of this small amount of movement to disengage wheel 130 from axle 102, the mounting is very rugged because the dovetail ridge and dovetail groove are abutting along their entire lengths when completely engaged.

Accordingly, a new and improved quick connect/release wheel and hub assembly has been disclosed. The new and improved quick connect/release wheel and hub assembly allows the mounting or removal of a wheel very quickly and with very little movement. Further, no special tools are required for the mounting or removal and different wheels on vehicles can be interchangeable if desire. The new and improved quick connect/release wheel and hub assembly can be made more rugged than present mounting apparatus and is inexpensive and easy to use.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A quick connect/release wheel and hub assembly comprising:

a first hub portion constructed for rotation about an axis and having a dovetail groove formed therein generally transverse to the axis;

a second hub portion constructed for rotation about the axis and having a mating dovetail ridge formed therein generally transverse to the axis, the dovetail ridge being positioned to be engaged in the dovetail groove by relative transverse movement of the first and second hub portions from a non-coaxial orientation into a coaxial orientation, the engaged dovetail ridge and dovetail groove holding the first and second hub portions fixedly together in the coaxial orientation;

a wheel attached to one of the first and second hub portions for rotation with the one of the first and second hub portions about the axis; and a movable member coupled to one of the first and second hub portions and movable between a connect position in which the first and second hub portions are held in the coaxial orientation and relative transverse movement of the first and second hub portions is prevented, and a release position in which relative transverse movement of the first and second hub portions from the coaxial orientation into the non-coaxial orientation is allowed.

2. A quick connect/release wheel and hub assembly as claimed in claim 1 wherein the dovetail groove and mating dovetail ridge each include a pair of spaced apart opposing elongated elements.

3. A quick connect/release wheel and hub assembly as claimed in claim 2 wherein the pair of spaced apart opposing elements of the dovetail groove and mating dovetail ridge are positioned to taper toward each other in a truncated V-shaped configuration.

4. A quick connect/release wheel and hub assembly as claimed in claim 1 including in addition an axially extending aperture defined in the first and second hub portions, the movable member being movably positioned in the aperture so as to extend into both the first and second hub portions in the connect position and to be in only one of the first and second hub portions in the release position.

5. A quick connect/release wheel and hub assembly as claimed in claim 1 including in addition a cam-acting lever attached to the movable member for moving the movable member between the connect position and the release position and for holding the movable member in a selected position.

6. A quick connect/release wheel and hub assembly as claimed in claim 1 wherein the movable member includes an elongated portion extending along the axis and contained within one of the first and second hub portions in the release position, and extending into both the first and second hub portions in the connect position.

7. A quick connect/release wheel and hub assembly as claimed in claim 1 wherein another of the first and second hub portions has an axle attached thereto for rotation with the wheel and the first and second hub portions about the axis.

8. A quick connect/release wheel and hub assembly as claimed in claim 1 including the one of the first and second hub portions on each side of the wheel and joined to form a wheel hub, and one of another of the first and second hub portions being positioned adjacent each side of the wheel.

9. A quick connect/release wheel and hub assembly comprising:
  a mounting hub constructed for rotation about an axis and having one of a dovetail groove and a dovetail ridge formed therein generally transverse to the axis;
  a wheel hub constructed for rotation about the axis and having one of a mating dovetail ridge and a mating dovetail groove formed therein generally transverse to the axis, the mating dovetail ridge and the mating dovetail groove being positioned to be engaged with the one of the dovetail groove and the dovetail ridge by relative transverse movement of the mounting hub and the wheel hub from a non-coaxial orientation into a coaxial orientation, the engaged one of the dovetail groove and the dovetail ridge and the one of the mating dovetail ridge and mating dovetail groove holding the wheel hub and the mounting hub fixedly together in the coaxial orientation; and
  a movable member coupled to one of the mounting hub and wheel hub and movable between a connect position in which the mounting hub and wheel hub are held in the coaxial orientation and relative transverse movement of the mounting hub and wheel hub is prevented, and a release position in which relative transverse movement of the mounting hub and wheel hub from the coaxial orientation into the non-coaxial orientation is allowed.

10. A quick connect/release wheel and hub assembly as claimed in claim 9 wherein the one of the dovetail groove and dovetail ridge and the one of the mating dovetail ridge and mating dovetail groove each include a pair of spaced apart opposing elongated elements.

11. A quick connect/release wheel and hub assembly as claimed in claim 10 wherein the pair of spaced apart opposing elements of the one of the dovetail groove and dovetail ridge and the one of the mating dovetail ridge and mating dovetail groove are positioned to taper toward each other in a truncated V-shaped configuration.

12. A quick connect/release wheel and hub assembly as claimed in claim 9 including in addition an axially extending aperture defined in the wheel hub and mounting hub, the movable member being movably positioned in the aperture so as to extend into both the wheel hub and mounting hub in the connect position and to be in only one of the wheel hub and mounting hub in the release position.

13. A quick connect/release wheel and hub assembly as claimed in claim 9 including in addition a cam-acting lever attached to the movable member for moving the movable member between the connect position and the release position and for holding the movable member in a selected position.

14. A quick connect/release wheel and hub assembly as claimed in claim 9 wherein the movable member includes an elongated portion extending along the axis and contained within one of the wheel hub and mounting hub in the release position, and extending into both the wheel hub and mounting hub in the connect position.

15. A quick connect/release wheel and hub assembly as claimed in claim 9 wherein the wheel hub has a wheel attached thereto and the mounting hub has an axle attached thereto for rotation with the wheel and the wheel hub and mounting hub about the axis.

16. A quick connect/release wheel and hub assembly comprising:
  a wheel including a wheel hub defining a rotation axis, the wheel hub having first and second outwardly directed faces oriented generally transverse to the rotation axis;
  one of a dovetail groove and a dovetail ridge formed in each of the first and second faces of the wheel hub;
  a mounting hub including a first portion having an inwardly directed face positioned adjacent the first outwardly directed face of the wheel hub and a second portion having an inwardly directed face positioned adjacent the second outwardly directed face of the wheel hub, the first and second portions of the mounting hub being mounted for rotation about the rotation axis and the inwardly directed faces of the first and second portions being oriented generally transverse to the rotation axis;
  one of a matching dovetail ridge and a matching dovetail groove formed in each of the inwardly directed faces of the first and second portions of the mounting hub, the one of the dovetail groove and the dovetail ridge formed in each of the first and second faces of the wheel hub being positioned to be engaged with the one of the matching dovetail ridge and the matching dovetail groove formed in each of the inwardly directed faces of the first and second portions of the mounting hub by relative transverse movement of the wheel hub from a non-coaxial orientation into a coaxial orientation, the one of the dovetail ridge and dovetail groove in each of the first and second faces of the wheel hub and the one of the matching dovetail ridge and the matching dovetail groove formed in each of the inwardly directed faces of the first and second portions holding the wheel hub and the mounting hub fixedly together in the coaxial orientation;
  an axially extending aperture defined in the wheel hub and the mounting hub; and
  a movable member coupled to the mounting hub and movable between a connect position within the aperture in which the wheel hub and the mounting hub are held in the coaxial orientation and relative transverse movement of the wheel hub and mounting hub is prevented, and a release position in which the movable member is at least partially withdrawn from the aperture to allow relative transverse movement of the wheel hub and mounting hub from the coaxial orientation into the non-coaxial orientation.

17. A quick connect/release wheel and hub assembly as claimed in claim 16 wherein the one of the dovetail groove and dovetail ridge and the one of the matching dovetail ridge and the matching dovetail groove each include a pair of spaced apart opposing elongated elements.

18. A quick connect/release wheel and hub assembly as claimed in claim 17 wherein the pair of spaced apart opposing elements of the one of the dovetail groove and dovetail ridge and the one of the matching dovetail ridge and the matching dovetail groove are positioned to taper toward each other in a truncated V-shaped configuration.

19. A quick connect/release wheel and hub assembly as claimed in claim 16 wherein the movable member includes an elongated portion extending along the rotation axis and contained within one of the first and second mounting hub portions in the release position, and extending into the wheel hub in the connect position.

20. A quick connect/release wheel and hub assembly as claimed in claim 16 including in addition a bicycle frame with the first and second portions of the mounting hub being mounted for rotation about the rotation axis by the bicycle frame.

21. A quick connect/release wheel and hub assembly as claimed in claim 20 wherein the bicycle frame is constructed to mount front and back wheels, and the front and back wheels are similar.

22. A quick connect/release wheel and hub assembly as claimed in claim 16 including in addition a front wheel mounting hub and a back wheel mounting hub, the back wheel mounting hub having at least one sprocket affixed thereto for driving rotation with the back wheel mounting hub.

* * * * *